US005743576A

United States Patent [19]

Schron, Jr. et al.

[11] Patent Number: 5,743,576

[45] **Date of Patent: *Apr. 28, 1998**

[54] HOIST DEVICE

[75] Inventors: Jack H. Schron, Jr., Chagrin Falls; Harry P. Fuller, Newbury; James C. Klingenberg, Concord, all of Ohio

[73] Assignee: Jergens, Inc., Cleveland, Ohio

[ * ] Notice: The term of this patent shall not extend beyond the expiration date of Pat. No. 5,634,734.

[21] Appl. No.: 813,628

[22] Filed: Mar. 7, 1997

Related U.S. Application Data

[63] Continuation-in-part of Ser. No. 542,947, Oct. 13, 1995, Pat. No. 5,634,734.

[51] Int. Cl.[6] .............................. B66C 1/66; F16G 15/08

[52] U.S. Cl. ................................ 294/1.1; 294/89; 403/78; 403/79; 403/164

[58] Field of Search .................................... 294/1.1, 82.1, 294/89; 403/78, 79, 119, 164, 165; 248/499; 410/101

[56] References Cited

U.S. PATENT DOCUMENTS

| | | |
|---|---|---|
| 3,297,293 | 1/1967 | Andrews . |
| 3,371,951 | 3/1968 | Bryant . |
| 3,492,033 | 1/1970 | Mueller . |
| 3,905,633 | 9/1975 | Larson . |
| 4,074,519 | 2/1978 | Garrett . |
| 4,431,352 | 2/1984 | Andrews . |
| 4,557,513 | 12/1985 | Ferrieri . |
| 4,558,979 | 12/1985 | Andrews . |
| 4,570,987 | 2/1986 | Wong et al. . |
| 4,592,686 | 6/1986 | Andrews . |
| 4,641,986 | 2/1987 | Tsui et al. . |
| 4,699,410 | 10/1987 | Seidel . |
| 4,705,422 | 11/1987 | Tsui et al. . |
| 5,183,360 | 2/1993 | Freeman . |
| 5,248,176 | 9/1993 | Fredriksson . |
| 5,286,130 | 2/1994 | Mueller . |
| 5,352,056 | 10/1994 | Chandler . |
| 5,405,210 | 4/1995 | Tsui . |

FOREIGN PATENT DOCUMENTS

| | | | |
|---|---|---|---|
| 179733 | 4/1986 | European Pat. Off. . | |
| 365430 | 4/1990 | European Pat. Off. ................ | 294/1.1 |
| 3453961 | 4/1986 | Germany . | |

OTHER PUBLICATIONS

Brochure—"Jergens Hoist Unmatched Lifting Flexibility", no date.

*Primary Examiner*—Dean Kramer
*Attorney, Agent, or Firm*—Vickers, Daniels & Young

[57] ABSTRACT

A hoist device for fixed engagement to a threaded bore on an outer surface of a load member is provided. The hoist device comprises a load engaging stud with a force supporting head, a cylindrical body portion with a lower annular bearing shoulder and a threaded shank depending from the annular shoulder of the body portion. A base member having a body portion with a central passage through the base member and allowing a free swivel engagement of the base member with the load engaging stud is provided. The central passage of the base member, having an upper recess for capturing the force supporting head and an upper annular shoulder for transmitting a force from the base member to the supporting head when the base member is pulled from the load member is also provided. A hoist ring is secured between the support member and the base member while allowing the base member to swivel around the stud. A slot in one of the members captures the hoist ring while allowing the hoist ring to pivot in the slot. The stud includes a tool driving portion and a force supporting head, the tool driving portion includes the tool engaging portion and the stud and access openings in one of the members registered with the tool engaging portion when one of the members and the stud are in a given relative angular position. In such position, an elongated tool can be extended through the opening into the tool engaging portion to rotate the stud and members in unison until the lower shoulder engages the surface of the load member.

18 Claims, 12 Drawing Sheets

FIG. 3
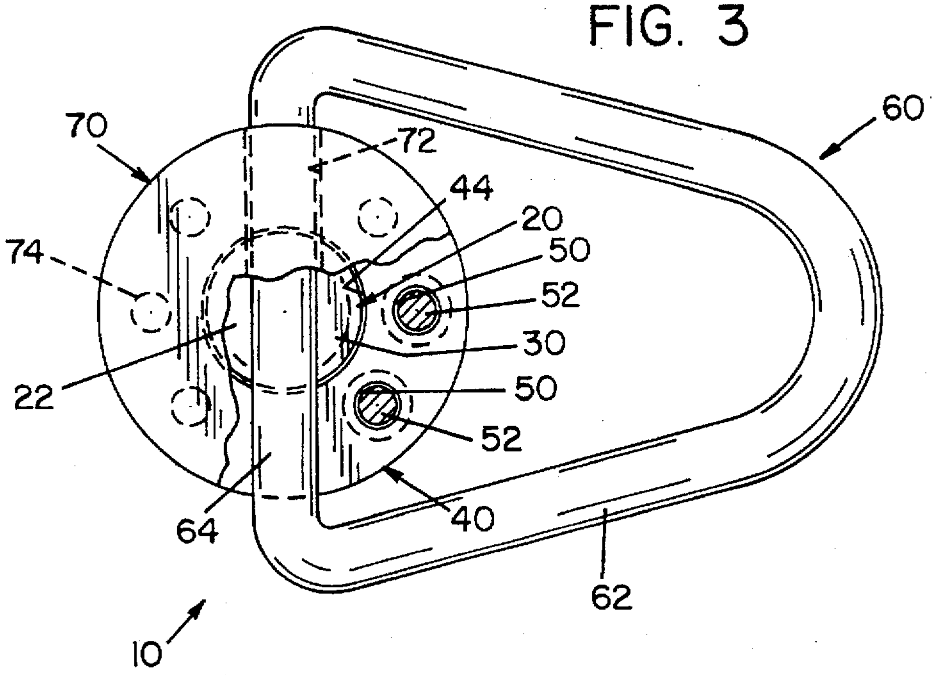
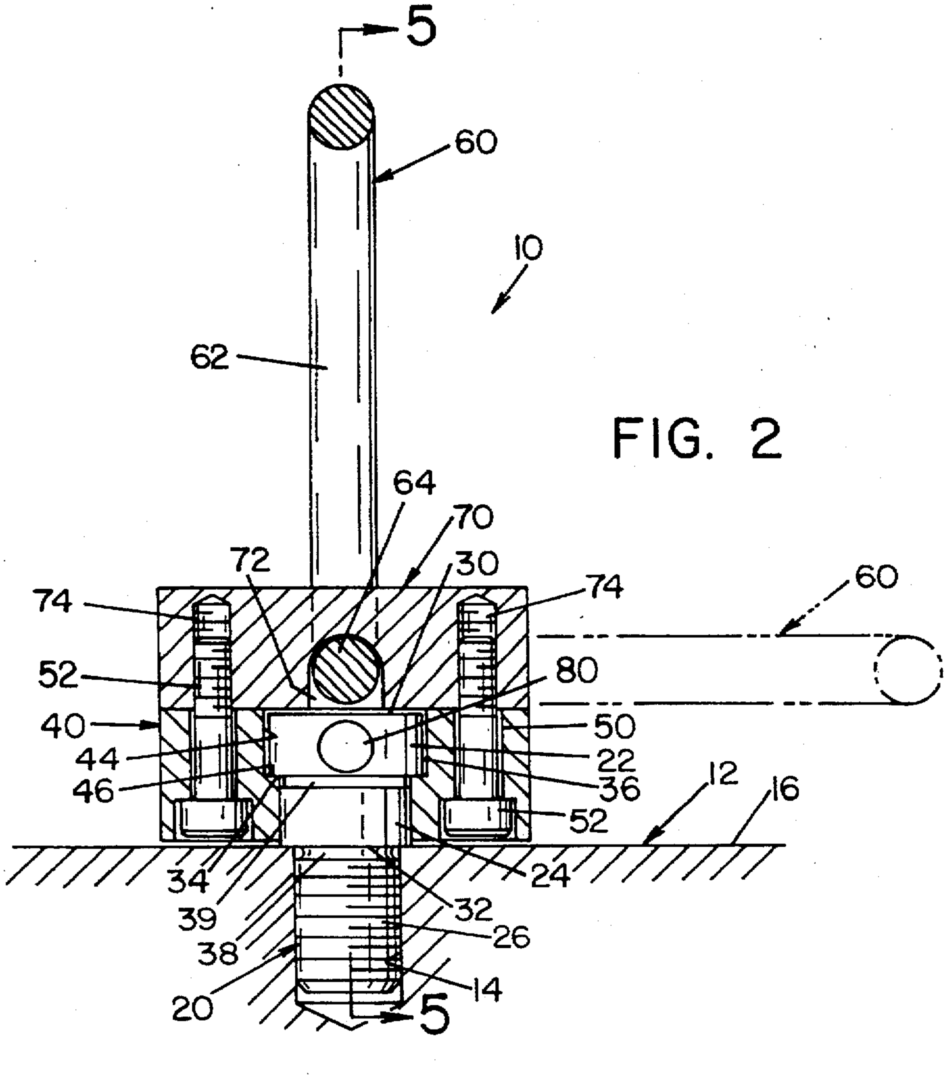
FIG. 2

FIG. 9
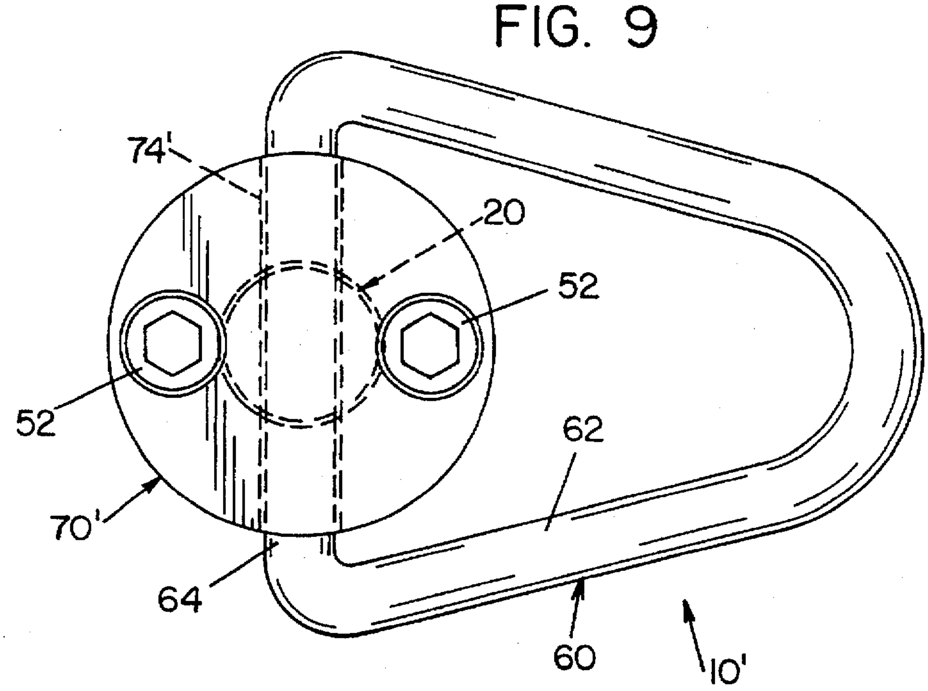
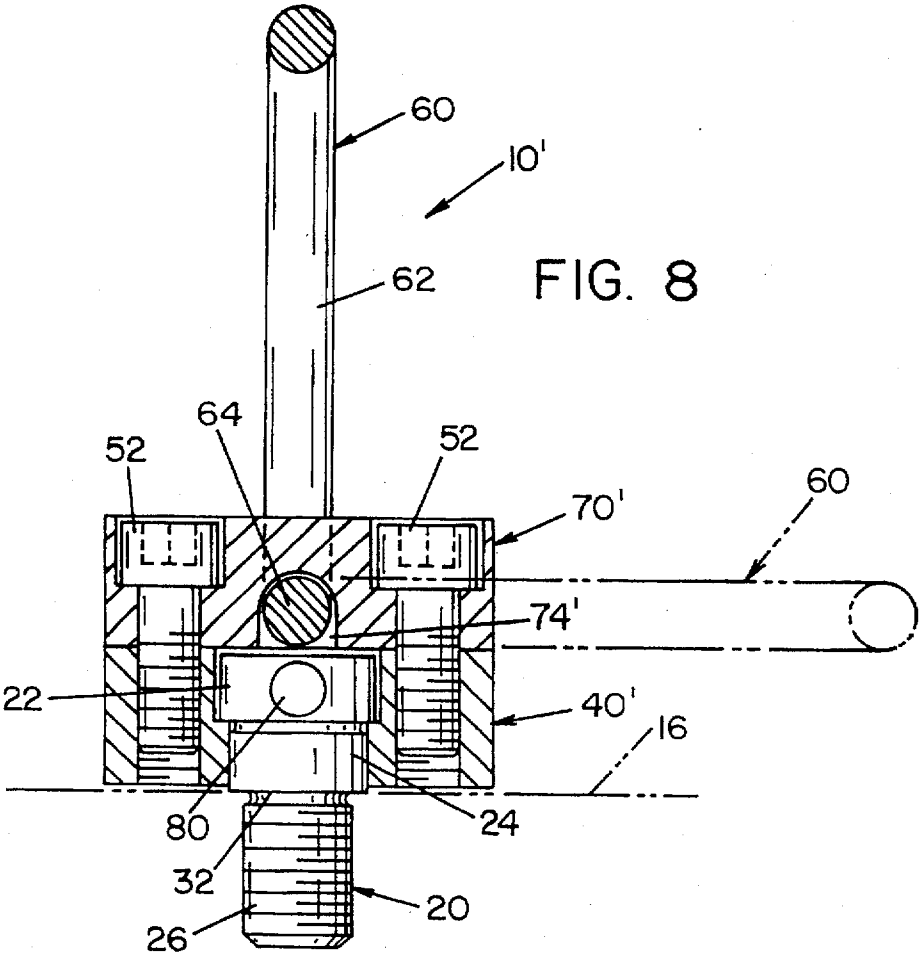
FIG. 8

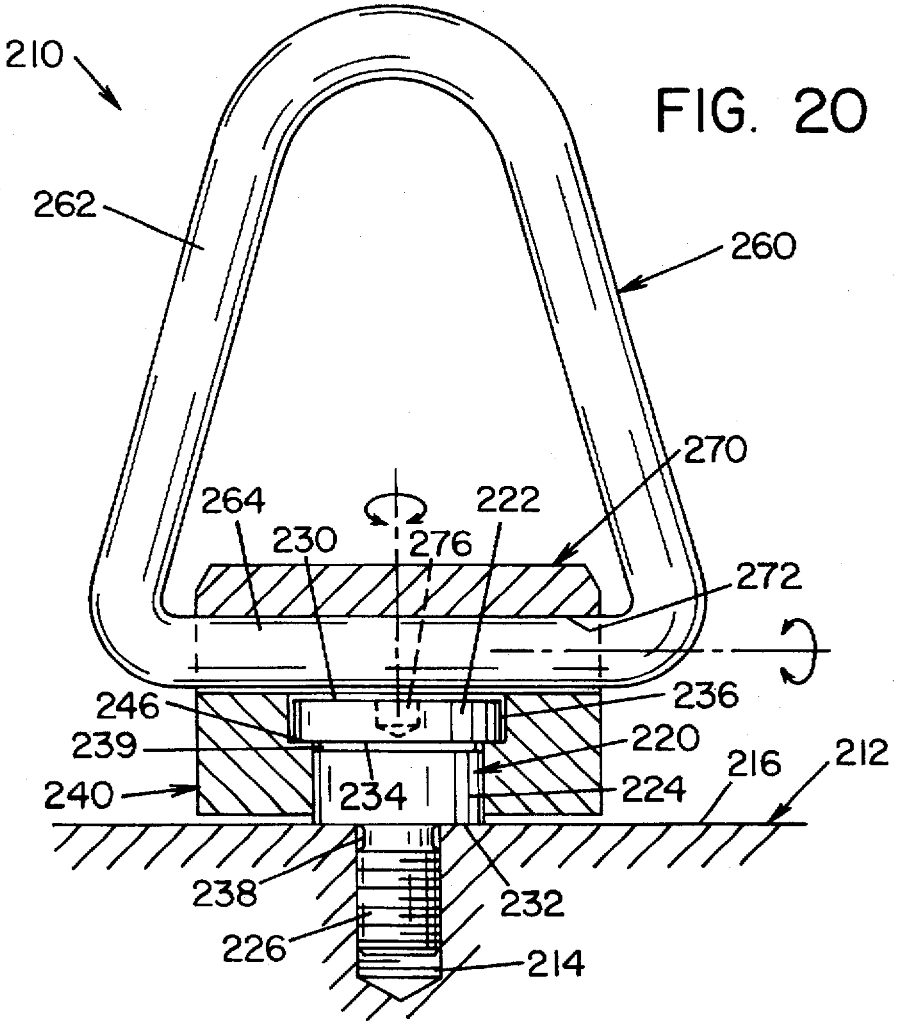
FIG. 20
FIG. 21
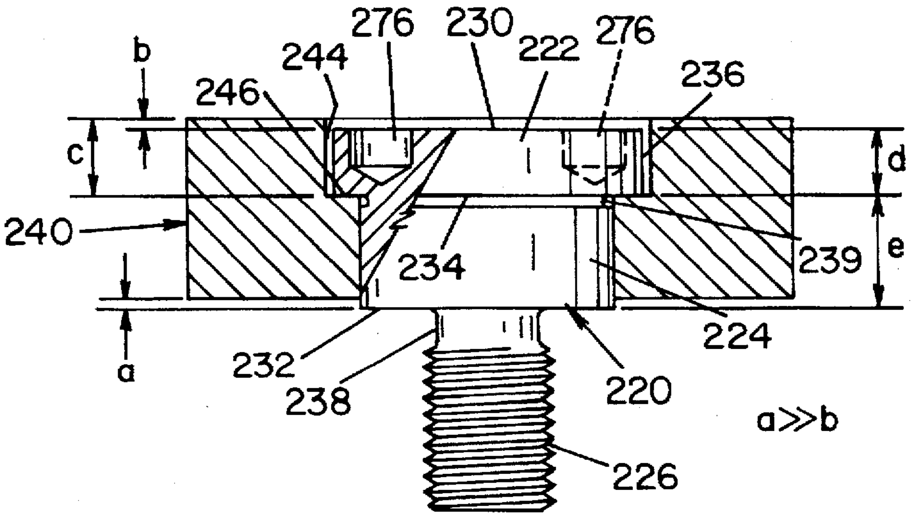

HOIST DEVICE

This is a continuation-in-part of application Ser. No. 08/542,947, filed Oct. 13, 1995 now U.S. Pat. No. 5,634, 734.

The present invention relates to the art of lifting or hoisting relatively heavy loads and more particularly to a hoist device for connection to a heavy load that is to be hoisted by a crane or assembler mechanism.

INCORPORATION BY REFERENCE

Incorporated by reference herein are Andrews U.S. Pat. No. 3,297,293; Andrews U.S. Pat. No. 4,431,352; Wong U.S. Pat. No. 4,570,978; Andrews U.S. Pat. No. 4,592,686 and Tsui U.S. Pat. No. 4,641,986. These patents all relate to a hoist device including a clevis that is pivoted through 180° and secured to a load member for supporting structure by a swivel mechanism wherein a stud is mounted in the load member or support structure in a manner to clamp a bushing between the stud and the member. The clevis is rotated around the bushing in a support or load bearing ring. These prior mechanisms together with fixed eye bolts and pivotably connected eye bolts are well known in the art and are incorporated herein by reference so that these structures need not be repeated. The eye bolts, either fixed or pivoted, are extremely inexpensive but they do not provide the swivel connection and versatility of the prior art also incorporated by reference herein.

BACKGROUND OF THE INVENTION

The present invention relates to a hoist device which can be used to lift a variety of heavy loads or objects such as dies, vehicles, internal combustion engines, etc. and it will be described with particular reference thereto; however, the invention has much broader applications and may be used for a variety of applications where it is necessary to secure a ring to a structure either to lift the structure or to for hold down a structure such as containers, airplanes, air vehicles, boats, etc.

The least expensive hoist device of the type to which the present invention is directed, is a standard eye bolt which is a ring cast with a depending shank which is threaded to be received in a threaded bore provided on the member to be lifted or hoisted. A mechanical hoist having a line with a hook is then used to lift the device by applying the hook through the eye bolt and operating the hoist device. Since an eye bolt is quite inexpensive, it is generally used in most high production applications such as motors, welders, generators, combustion engines, etc. Such commodities are provided with eye bolts so that they can be hoisted and maneuvered into the desired position. The difficulty with the eye bolt is that it cannot compensate for lifting forces which are not actually aligned with the axis of the shank on the eye bolt. Thus, the eye bolts are usually made relatively heavy to compensate for the lack of versatility of the eye bolts.

Through the years, a large number of hoist devices have been developed which allow for the ring connected to the hook of the hoist to pivot and swivel for the purpose of automatically adjusting the disposition of the ring with respect to the force being applied by the hoist during the lifting procedure. Such devices are found in the patents incorporated by reference herein and all are extremely expensive. In addition, they generally have disadvantages. These prior devices cannot be easily disassembled and tested in the field. In addition, if they are assembled differently, they react and operate differently. Thus, they cannot be easily tested after use or reassembled and operate consistently. The reason for these disadvantages is because of the complexity of the structure necessary for accomplishing the swivel action. In addition, these devices utilize a clevis which is less strong than the continuous ring of an eye bolt.

The use of a clevis has been dictated by the structure necessary for accomplishing the swivel action in the prior devices. The swivel action is accomplished by a stud clamping a ring against a bushing. The bushing defines a track or guideway for a support ring to swivel about a bolt. In using such structures, the only manner in which a ring can be mounted to the support ring that can swivel is by employing a clevis construction. Such constructions are extremely expensive and cannot be disassembled and tested in the field. The weight and cross-section of the clevis must be such that it cannot be pulled away from the swivel ring mechanism. All of these requirements of the prior hoist rings which allow both swivel movement of the ring while also allowing the ring to move or pivot about the pins of the clevis contribute to the extreme cost, complexity, inability to disassemble or reassemble and test, and related problems.

SUMMARY OF THE INVENTION

The present invention is an improvement in the art of hoist devices as defined above. In accordance with this improvement, the hoist device of the present invention has the advantages of an eye bolt or pivoted ring while also obtaining the desirability and benefit of allowing the hoist device to swivel through a full circle about the axis of the stud mounting the hoist device onto the load member. Consequently, the present invention overcomes the difficulties of fixed rings or other pivoted rings without the resulting costs associated with other efforts to provide both a pivoted and swiveling hoist ring.

In accordance with the present invention, there is provided a hoist device for fixed engagement to a threaded bore on the outer surface of a load member such as a die. The hoist device of the invention comprises a load engaging stud with a force supporting head, a cylindrical body portion with a lower, annular bearing shoulder and a threaded shank depending from the annular shoulder of the body portion. In some instances, the body portion can be formed from stock which is polygonal in cross-section. The term "cylindrical" is intended to be a general description of the preferred embodiment. In this manner, the stud having an upper head is threaded onto the load member. In accordance with the invention, the stud is used with a base member having a body portion with a central passage through the base member and allowing a swivel engagement of the base member with the stud when the support stud is fixed to the load member by threading the shank of the stud through the central passage into the load member bore until the lower bearing shoulder of the stud is drawn against the outer surface of the load member. With this arrangement, the base member is captured between the head of the stud and the load member. The stud has a stop which controls the movement of the stud member into the threaded bore of the load member. The stop or shoulder on the stud is used to place the shank of the stud in tension by torquing the stud in the threading operation. The central passage of the base member has enough recess for capturing the load supporting head of the stud and an upper annular shoulder means for transmitting a force from the base member to the supporting head of the stud when the base member is pulled from the load member during the lifting or hoisting operation.

As so far described, the invention does not use a bushing which is compressed to place the stud in tension. Such concept is normally applied in the prior art swivel hoist rings. The base member freely rotates about the stud whereas in the prior art the clamped bushing is non-rotatable. The clevis is engaged with the bushing in a manner to allow rotation with respect to the bushing. This is a completely different structure than the present invention wherein the base member rotates about its central passage captured between the head of the support stud and the member being lifted.

In accordance with another object of the present invention, the stud includes a tool driving portion in the force supporting head. Specifically, the tool driving portion includes a tool engaging portion in the stud and at least one access opening in one of the members registered with the tool engaging portion when one of the members and the stud are in a given relative angular position. An elongated tool can then be extended through the opening into the tool engaging portion to rotate the stud and the base members in unison until the lower shoulder engages the surface of the load member. In an important embodiment, the force supporting head includes two axially extending holes for engagement with a hex head wrench having two mating driving portions extending therefrom and adapted to be received within the axially extending holes. Thus, upon rotation of the wrench, a load engaging stud can be rotated into a fixed position within the load member.

In accordance with the present invention, the hoist ring has an upper bight portion and a lower generally cylindrical connecting portion connected to the body portion of the base member which is rotatable about the stud. A supporting member having a profile generally the same as the lower base member is fixedly secured to the base member so it rotates about the stud. By providing a slot in one of these members between the body portion of the upper support member and the body portion of the lower base member, the cylindrical connecting portion of the hoist ring is captured in the swivel assembly comprising the support member and base member. This assembly is relatively simple and allows both the pivoting action of the hoist ring as well as swivel action of the total assembly. There is no requirement for a clevis construction as required by the prior art when combining both the swivel action and the pivoting action of the ring.

In accordance with another aspect of the invention, the two body portions of the support member and the base member are generally cylindrical. The slot used in the invention is in one of the members. Preferably, the slot is in the support member; however, it may also be in the base member. Irrespective of the location of the slot, the continuous ring has a lower cylindrical connected portion extends between the two rotating members, the base member and the support member, to obtain the advantages of both an eye bolt and the complex, expensive multi-directional hoist vices heretofore available.

In accordance with another aspect of the invention, the hoist ring is forged steel; however, it can be cast iron or can be formed when an elongated bar bent into a continuous shape and welded at its touching ends. In practice, the steel is 4140; however, various types of steel such as low carbon steel can be employed in practicing the invention.

In accordance with another aspect of the present invention, a variety of arrangements could be provided for joining or securing fixedly the jointly rotating base member and ring support member. In practice this securing arrangement is preferably a plurality of bolts extending from one member to the other; however, the two members could be welded together or pins could be placed through the sides of one member for a permanently joined hoist device which would not need to be disassembled.

In accordance with still a further object of the present invention, the length of the load supporting head for the stud and the internal recess for capturing this head is positioned so that the head is movable in the recess even after the support member is in place. In this manner, the two joined members freely rotate about the head of the stud. In a like manner, the lower shoulder for the intermediate portion of the stud that is torqued against the outer surface of the load member extends outwardly from the lower portion of the base member for the hoist device. This extension is greater than the difference in height of the head and recess for the base member so that under no circumstance will the swiveling base member engage the outer surface of the load member being hoisted or lifted. Of course, this is a preferred arrangement for the device and the device would still rotate even if there were certain amounts of rubbing action. Such action is not desired and in accordance with one aspect of the invention, is mechanically prevented.

The primary object of the present invention is the provision of a hoist device which combines the advantages of an eye bolt and the advantages of both swiveling and rotating action.

Another object of the present invention is to provide a hoist device which can be easily installed with a standard socket wrench.

It is yet another object of the present invention to provide a hoist device which can be installed in inaccessible areas with a tool that does not employ a lever arm.

A further object of the present invention is the provision of a hoist device, as defined above, which device is relatively inexpensive, incorporates a continuous ring instead of a clevis and is capable of being disassembled and tested after use.

Still a further object of the present invention is the provision of a hoist device, as defined above, which hoist device can be tested by non-destructive testing. These and other objects and advantages will become apparent from the following description. These and other objects and advantages will become apparent to those skilled in the art upon reading the following description taken together with the accompanying drawings.

BRIEF DESCRIPTION OF THE DRAWINGS

Reference may now be made to the drawings, which illustrate various embodiments that the invention may take in physical form and in certain parts and arrangements of parts wherein:

FIG. 2 is a side, partially cross-section view of the first embodiment of the present invention;

FIG. 3 is a top view somewhat cut away of the first embodiment of the present invention;

FIG. 8 is a cross-sectional view of the modification of the present invention illustrated in FIG. 7;

FIG. 9 is a top view of the present invention shown in FIG. 7;

FIG. 20 is a simplified view showing the operating characteristics made possible by the implementation of the fourth embodiment of the present invention, taken along line 20—20 of FIG. 19;

FIG. 21 is a cross-sectional view showing the dimensional aspects of the base member and load supporting stud employed in the fourth embodiment of the present invention;

PREFERRED EMBODIMENTS

Figure 1:
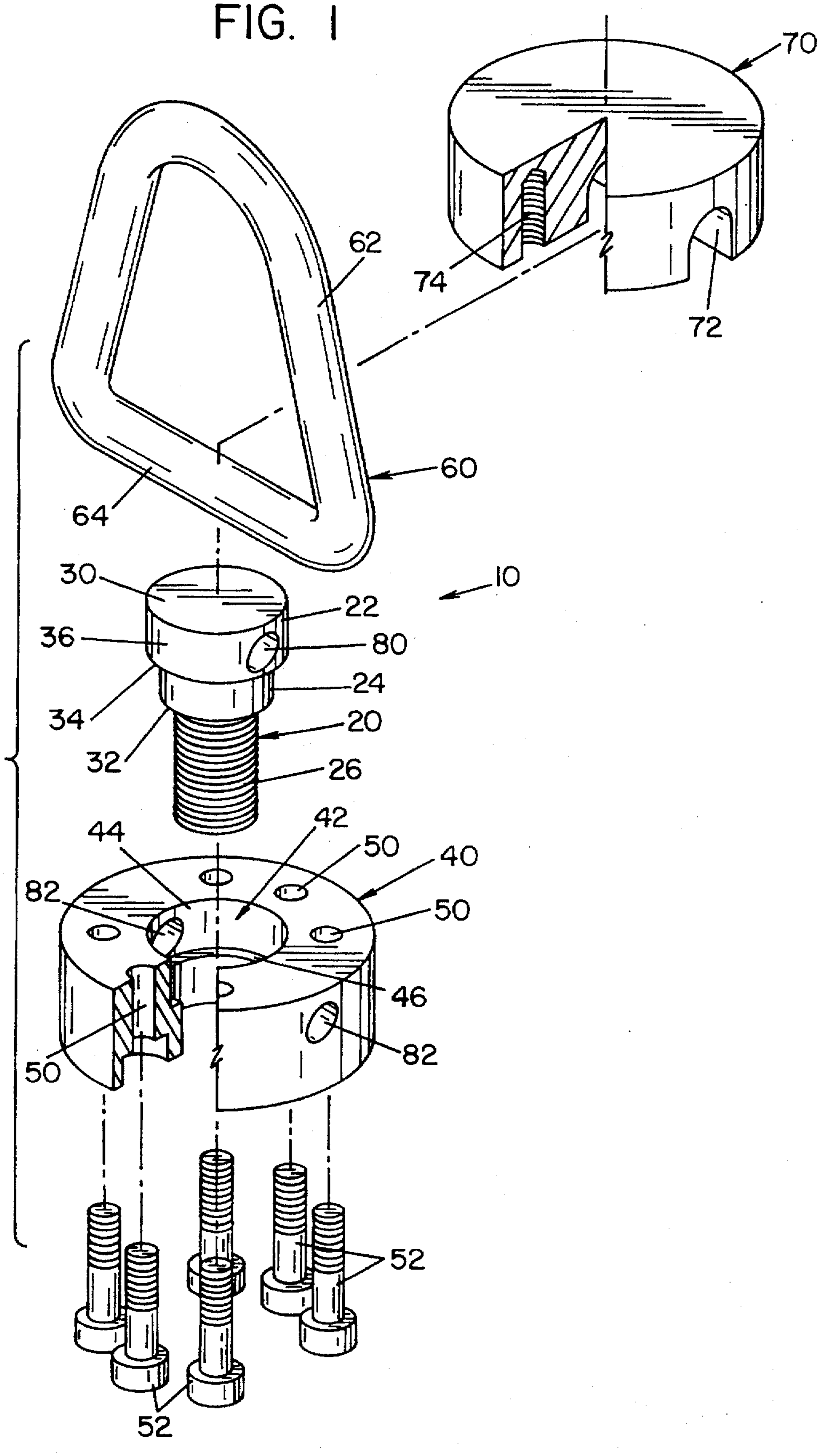
FIG. 1 is an exploded view of a first embodiment of the present invention.

Referring now to the drawings wherein the showing is for the purpose of illustrating preferred embodiments of the invention only and not for the purpose of limiting the same, FIGS. 1–4 show a hoist device 10 for connection to a load member 12 shown in FIG. 2. The member 12 has a threaded bore 14 and an upper generally flat surface 16 for illustrative purposes. A hoist device supporting stud 20 includes an upper cylindrical head 22 with a cylindrical body portion 24 below head 22 and terminating in a lower threaded shank 26. The diameters of the head, cylindrical body portion and threaded shank are progressively decreased as illustrated in FIG. 2. Stud 20 is the load bearing member which must absorb both shear and tension in operation of hoist device 10. The stud is illustrated with a top surface 30 having a lower bearing surface 32 which is torqued against surface 16 when stud 20 is in its load supporting position. The under-surface of head 22 defines a downwardly facing load supporting shoulder 34 which is an annular shoulder or surface below the cylindrical surface 36 of head 22. Stud 20 is illustrated as having a recessed portion 38 between shank 26 and body portion 24 so that the threads can be properly machined into shank 26. A similar recess 39 divides head 22 from body portion 24.

To provide the swivel mechanism of the first embodiment, a cylindrical base portion 40 is rotatably mounted on stud 20 after the stud has been passed through a central passage 42 of member 40. This central passage includes an upper recess 44 for capturing head 22 and has an upper shoulder 46 engaging shoulder 34 of head 22. This engagement is the force transmitting structure so that as member 40 is pulled upwardly shoulder 46 engages lower shoulder 34 of head 22 so the stud provides the lifting force for member 12. The central passage dimensions illustrated in FIG. 6 as they relate to the dimensions of the stud 20 so that member 40 swivels around the assembled stud 20. The base member also includes a plurality of counter sink bolt holes 50 for bolts 52. In the illustrated embodiment, fixed bolts are employed; however, as shown in other embodiments of the invention, two or four bolts could be employed for assembling the hoist device 10.

A continuous hoist ring 60 having an upper bight portion 62 and a straight cylindrical connecting portion 64 is provided by an appropriate process. In the preferred embodiment, hoist ring 60 is a continuous forged steel component. It could be a cast iron component or it could be formed into an appropriate shape from a single piece of steel and welded together. In accordance with the invention, the hoist ring is a continuous ring as opposed to a clevis as shown in the prior art which maintains its strength and integrity and prevents transfer separation even when a lifting hook is applied at the wrong angle in the lifting operation.

In accordance with the invention, a cylindrical port member 70 matching generally the shape of base member 40 is provided with a slot 72 for capturing cylindrical portion 64 of ring 60 between base member and support member 70. A plurality of threaded bores 74 co-act with bolt holes 50 to allow bolts 52 to clamp the cylindrical body portions of members 40, 70 together in a manner which captures hoist ring 60 between the two members. These members rotate in unison about stud 20 while hoist ring 60 can pivot through approximately 180°.

Hoist device 10 has the advantages of the continuous ring type hoisting device as well as the swiveling action heretofore obtainable only in a clevis type of hoist device. The present invention does not clamp a bushing between stud 20 and surface 16. Of course, such a bushing could be employed in some arrangement which would still obtain the advantages of the present invention but would replace the stationary cylindrical surface of the stud with the stationary surface of the clamped bushing.

In practice, a socket is provided in the top 30 of head 22 for the purpose of using an allen wrench for assembling stud 20 into threaded bore 14 on load member 12.

Figure 4:
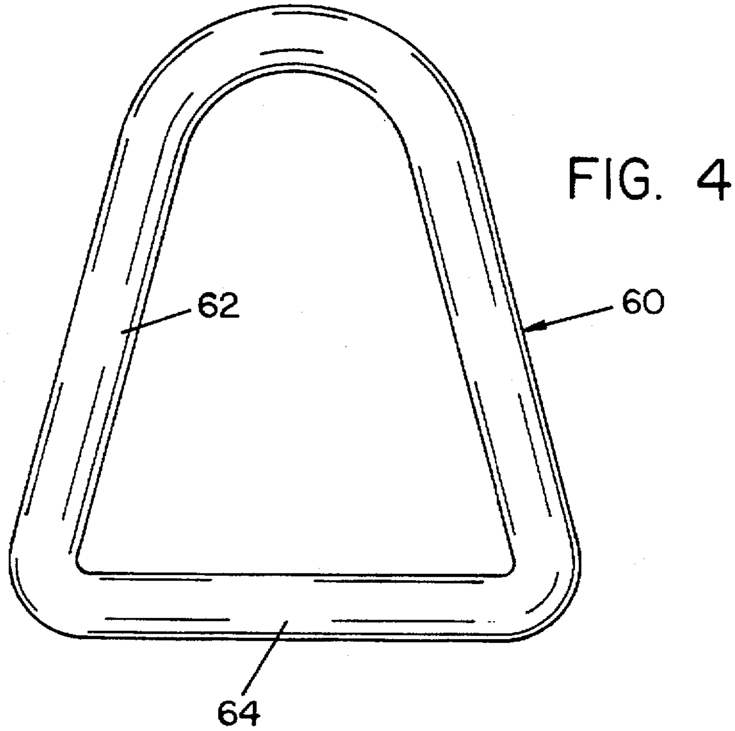
FIG. 4 is a side view of the hoist ring used in accordance with the present invention.
Figure 5:
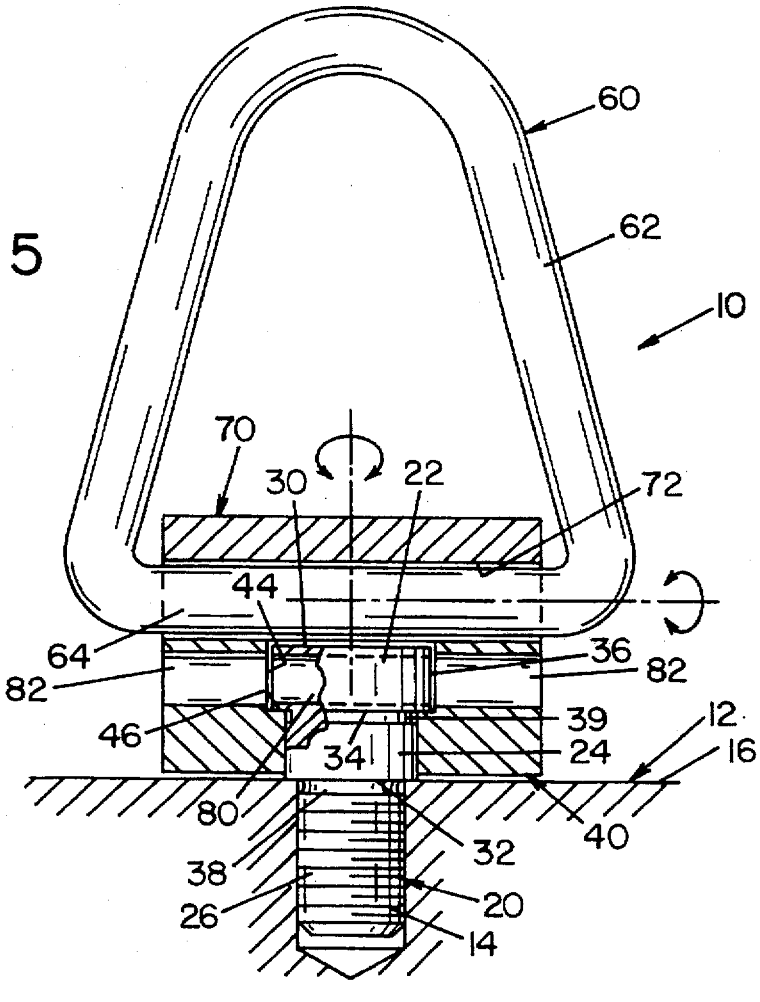
FIG. 5 is a simplified view showing the operating characteristics made possible by the implementation of the first embodiment of the present invention.

In accordance with another aspect of the invention, the socket can be replaced by the diametrically extending passage shown as a bore 80 through head 22. To assemble stud 20 into bore 14, bolts 52 assemble members 40, 42 for capturing stud 20 and recess 44 and cylindrical connecting portion 64 in slot 72. This is a total assembly which can be shipped to the place of ultimate use for hoist device 10. At the site, an elongated rod or tool is pushed through holes 82 in base member 40. Stud 20 is rotated in recess 44 until passage or bore 80 registers with holes 82. The appropriate elongated tool then extends through head 22 of stud 20 so that the stud can be torqued into its proper position as shown in FIG. 2. The overall operating characteristics of the first embodiment of the invention is illustrated in FIG. 4. The essential aspects of the invention are illustrated as including an arrangement for pivoting ring 60 as well as swiveling ring 60 by the swiveling action of the members 40, 70 after they have captured the stud and the connecting portion 64 of lifting ring 60.

Figure 6:
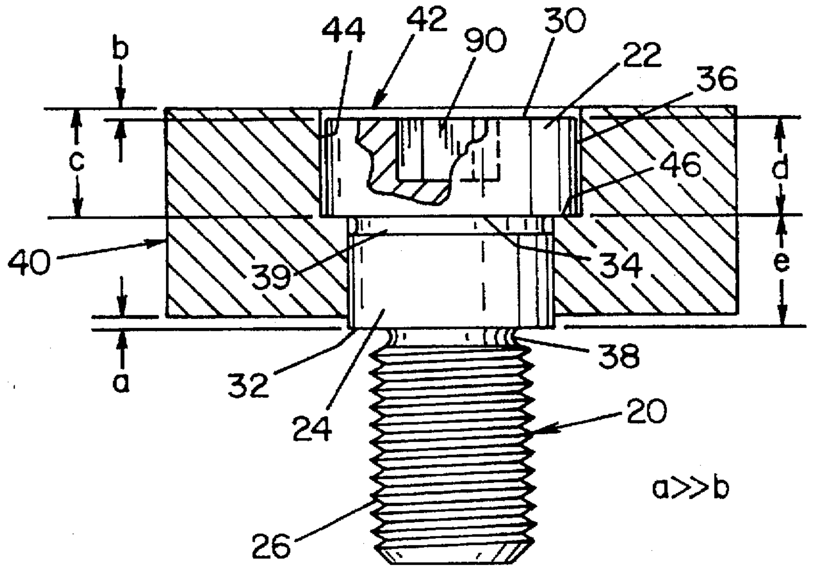
FIG. 6 is a cross-sectional view joining the dimensional aspects of the base member and load supporting stud employed in the first embodiment of the present invention.

Referring now to FIG. 6, certain dimensional aspects of the present invention are illustrated. These dimensions are apparent from the description of the invention; however, FIG. 6 illustrates that dimension a is the amount that portion 24 of stud 20 extends from base member 40 when head 22 is in its lowered position in recess 44. In that condition, dimension b is the clearance between the top of member 40 and the top 30 of head 22. In practice, dimension a is substantially greater than dimension b. In this fashion, the two members 40, 70, after secured together, are opted to their lowest extent, the lower surface of member 40 will not engage surface 16 while load member 12 is connected to stud 20. Dimension c is the height of recess 44. This dimension is greater than the height d of head 22. By this relative relationship of the height of the recess and the height of the head, the head does not bind in recess 44 after the lower flat surface of support member 70 is clamped against the upper flat surface of base member 40. As a final dimensional aspect, body portion 24 has an effective length e between the lower portion of head 22 and the lower bearing shoulder 32 of stud 20. The dimension e dictates the outward extension of portion 24 as illustrated by dimension a. These dimensions are provided to illustrate the first embodiment by which the present invention is manufactured to maintain a free swiveling action.

Figure 7:
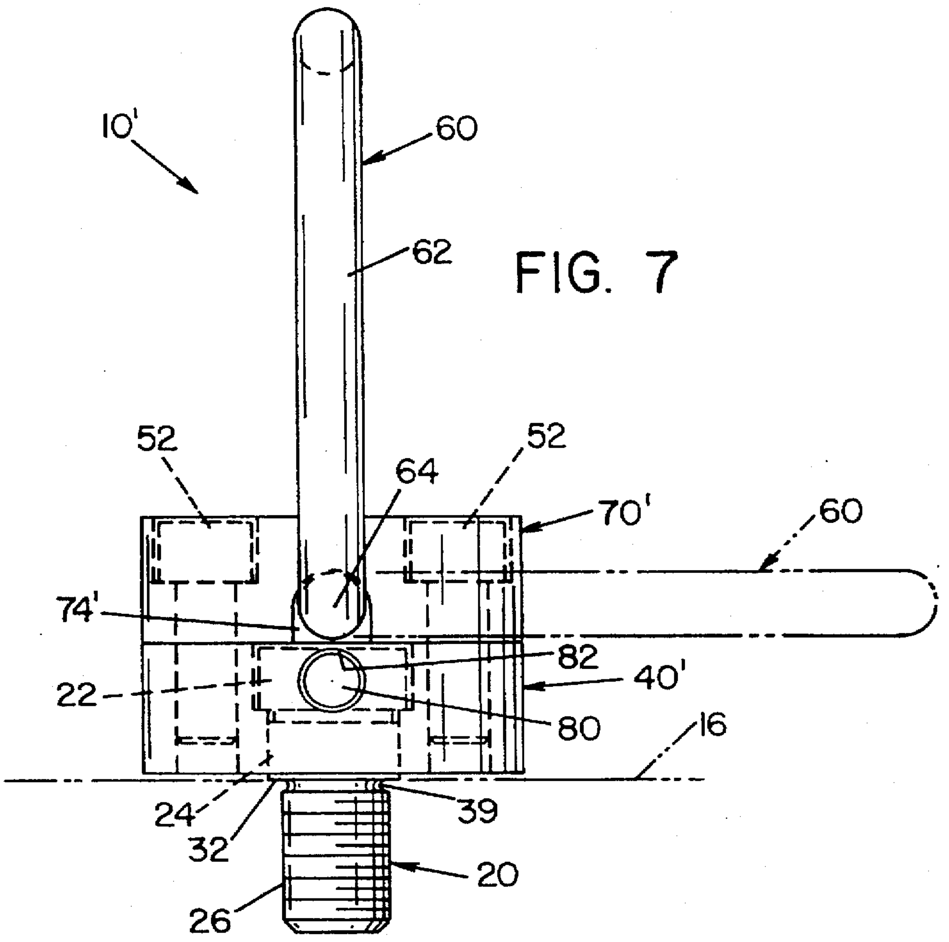
FIG. 7 is a view similar to FIG. 2 showing a modification of the first embodiment of the present invention.

Referring now to FIGS. 7–9, a modification of the first embodiment is illustrated wherein bolts 52 extend from the upper support member 70' into the lower base member 40'. In other respects, the embodiment shown in FIGS. 7–9 is the same as the first embodiment illustrated in FIGS. 1–4. The hoist device 10' operates in the same fashion. In this modification, the bolts will be exposed with use of hoist unit 10'. As previously described, a socket may be used for threading stud 20 into the threaded bore of load member 12. This structure is illustrated as socket 90 in FIG. 6. if such an arrangement were employed, then the embodiment of FIGS. 7–9 would provide simplicity in the field. Member 40' would be assembled over stud 20 which would be torqued into its proper position. Hereinafter, ring 60 would be assembled into slot 74' and then the cylindrical body portion of support member 70' would be assembled onto piece member 40' by bolts 52 as best shown in FIG. 8.

Figure 10:
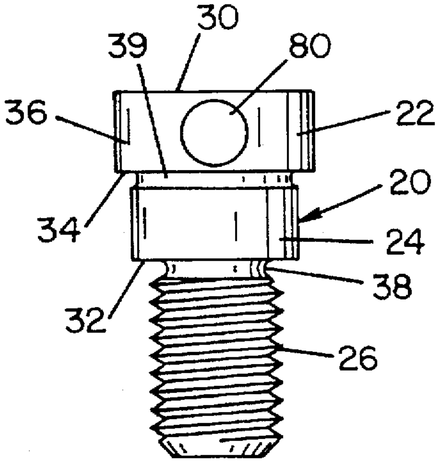
FIG. 10 is a side elevational view of the load supporting stud used in the first embodiment of the present invention.
Figure 11:
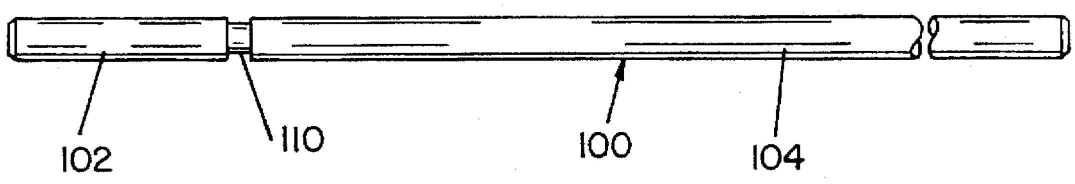
FIG. 11 is a side view of a torque controlling tool used with the stud shown in FIG. 10.
Figure 12:
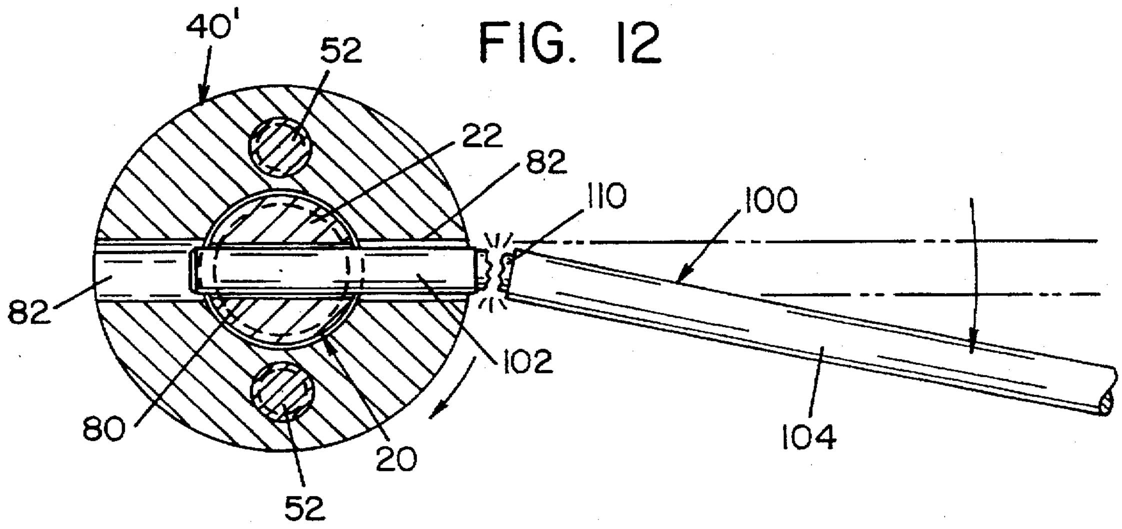
FIG. 12 is an operational view showing an embodiment of the invention in cross-section using the tool shown in FIG. 11 for controlling the torque applied to the load supporting stud shown in FIG. 10.

In accordance with a further aspect of the invention, the hoist device 10', is assembled by extending an elongated tool 100 through holes 82 and passage of bore 80 of head 22. This arrangement is illustrated in FIGS. 10–12. The elongated tool in practice may be a screwdriver or other similar device. By aligning bore 80 with holes 82 in the base member, an elongated tool is extended through the head of stud 20 so that the stud can be torqued into its proper position with the appropriate amount of force being exerted between the lower shoulder of portion 44 and the upper surface of the load.

In accordance with an aspect of the invention, tool 100 is provided with an operating end 102 and a handle portion or end 104. Adjacent end 102 is a necked-down area 110 which has a cross-section determined by the torque to be applied to stud 20 in the assembly process. Tool 100 is hardened so that it will fracture the area 110 when the appropriate torque has been applied to stud 20. This concept is illustrated in FIG. 12. By using this concept, the arrangement for securing the two cylindrical members 40, 70 together would allow the application of the preferred embodiment illustrated in FIGS. 1–4. The bolts can be extended from the bottom member 40 to the top member 70. In summary, using the passage 80, an elongated tool is used to assemble stud 20.

In accordance with an aspect of the invention, the torque responsive tool 100 shown in FIG. 11 has certain advantages since it will result in consistent torquing of stud 20. Should it be desirable to prevent removal of stud 20, epoxy resin could be deposited in bore 80 of head 22 to prevent further use of elongated tool. This preventive measure is not a preferred aspect of the invention.

Figure 13:
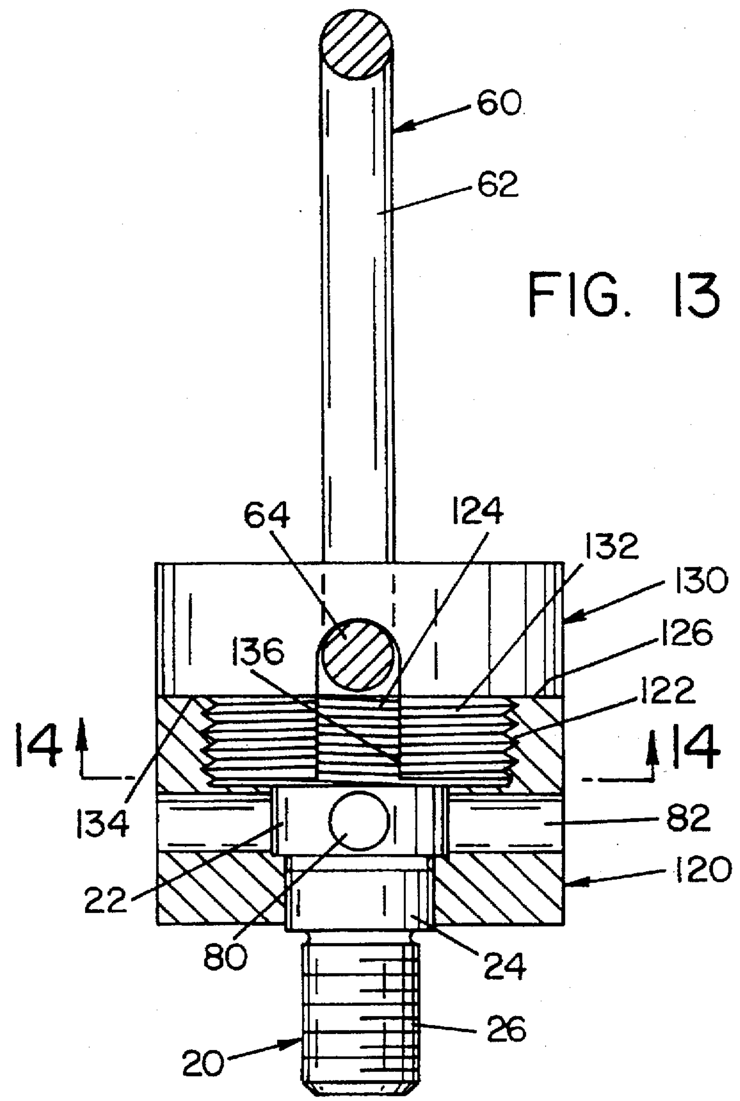
FIG. 13 is a side elevational view of a second embodiment of the present invention.
Figure 14:
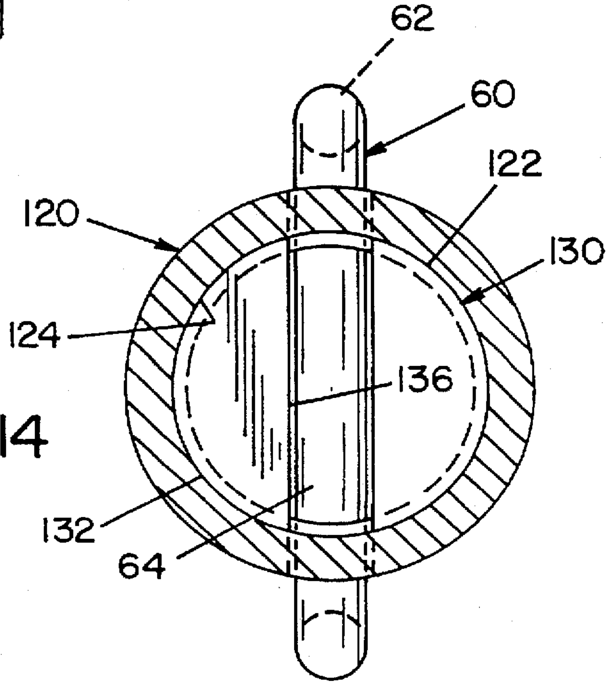
FIG. 14 is a cross-sectional view taken generally along line 14—14 of FIG. 13.

In accordance with another aspect of the invention, bolts 52 can be replaced by using threaded surfaces on the base member and the upper ring support member. In this aspect of the invention, the base member could be provided with female threads while the upper support member is provided with male threads. A hoist device using this concept is illustrated in FIGS. 13 and 14. Base member 120 includes a cylindrical recess 122 with relatively large diameter female threads 124 and a flat upper surface 126. Upper support member 130 has a downwardly extending cylindrical member with outwardly extending male threads 132. These threads coact with threads 124 to assemble members 120, 130. The lower surface 134 of member 130 is clamped against surface 126 by rotation of hoist ring 60 in slot 136. Slot 124 is fairly deep in the vertical direction to allow movement of hoist ring 60 when it is captured between the members and above the inner section of flat surfaces 136, 134.

Figure 15:
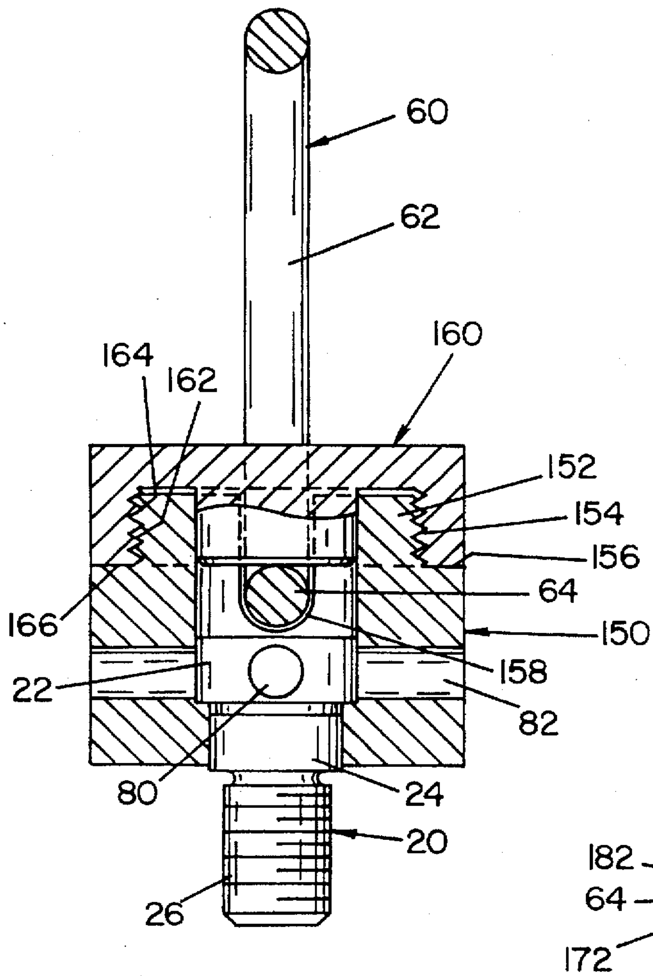
FIG. 15 is a cross-sectional view of a third embodiment of the present invention.

As shown in FIG. 15, a base member 150 has an upper protrusion 152 with outwardly male threads 154 above the upper surface 156 of member 150. In this embodiment, lower base member 150 includes the slot 158 necessary for the capturing of ring 60. Upper support member 160 includes a cylindrical recess 162 with inwardly extending female threads 164 terminating in a lower flat surface 166. This surface coacts with surface 152 above that portion of slot 158 which captures portion 64 of ring 60. This arrangement allows for the use of threads on the support member and the base member but the threads are reversed from the structure shown in FIGS. 13 and 14. As can be seen, this reversal causes the slot for ring 60 to be positioned on the other member.

Figure 16:
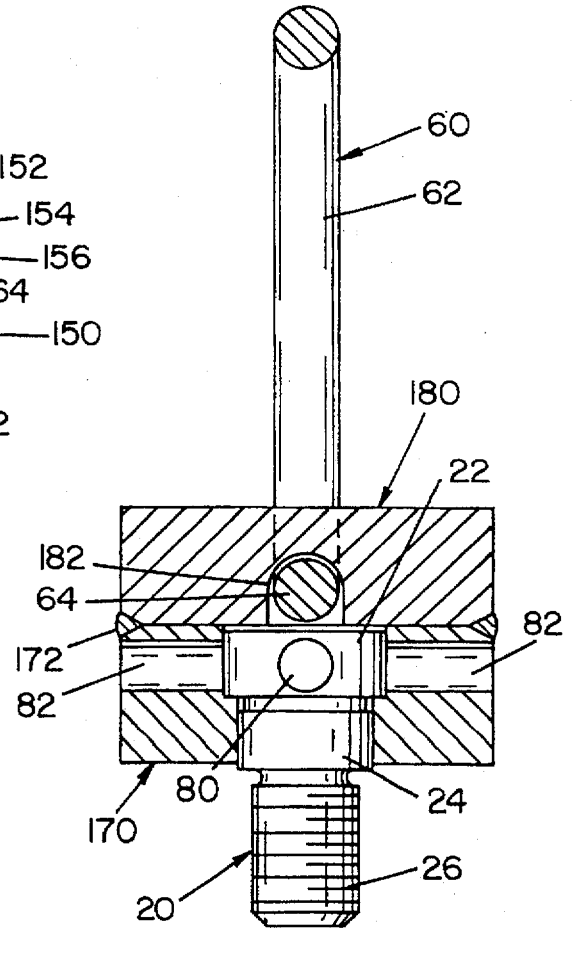
FIG. 16 is a side view, partially cut away, illustrating an additional arrangement for connecting the support member and base member of the illustrated embodiments of the present invention.

Another modification of the invention is illustrated in FIG. 16 where the base member and the support member are permanently welded together. In the embodiment, base member 170 is secured by a peripherally extended weld seam 172 of the support member 180 having the slot 182 for capturing ring 60 between the two assembled members. Using this aspect of the invention, the hoist device is permanently assembled and requires the use of the bore 80 in stud 20 and holes 82 as previously described.

In another modification of the invention, not shown, the base member and support member are permanently secured together by pins. This modification can be best visualized by reference to FIGS. 13 and 15. In this modification, pin bores are drilled into the sides of member 120, 130 of guide 13 or 150, 160 of FIG. 15 such that a pin can be inserted through the pin bore to secure the two members together. In this embodiment, the threading in the members may be eliminated. Two or more pins are used to hold the members together and are preferably positioned generally symmetrical about the sides of the members.

Figure 17:
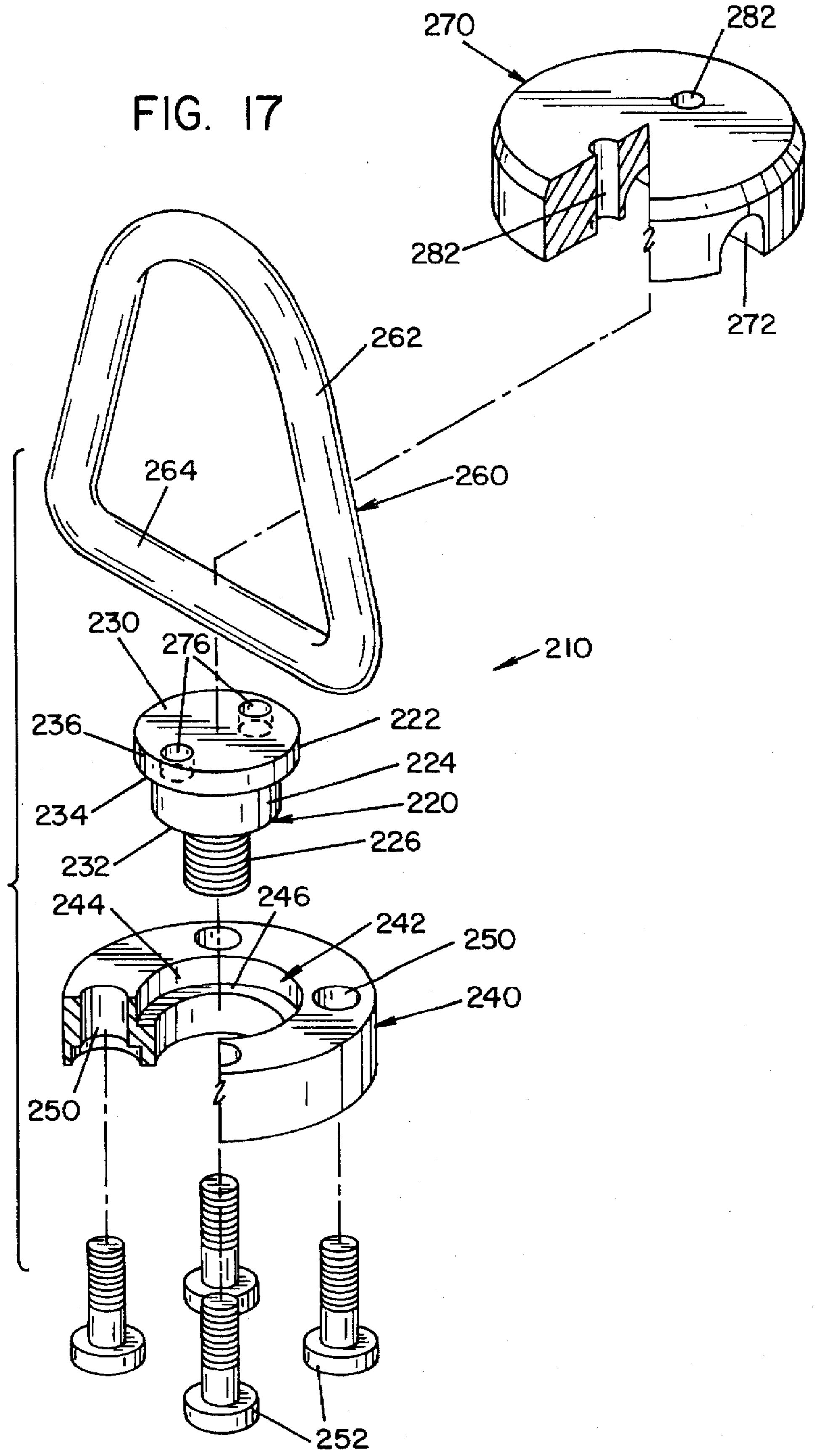
FIG. 17 is an exploded view of a fourth embodiment of the present invention.
Figure 18:
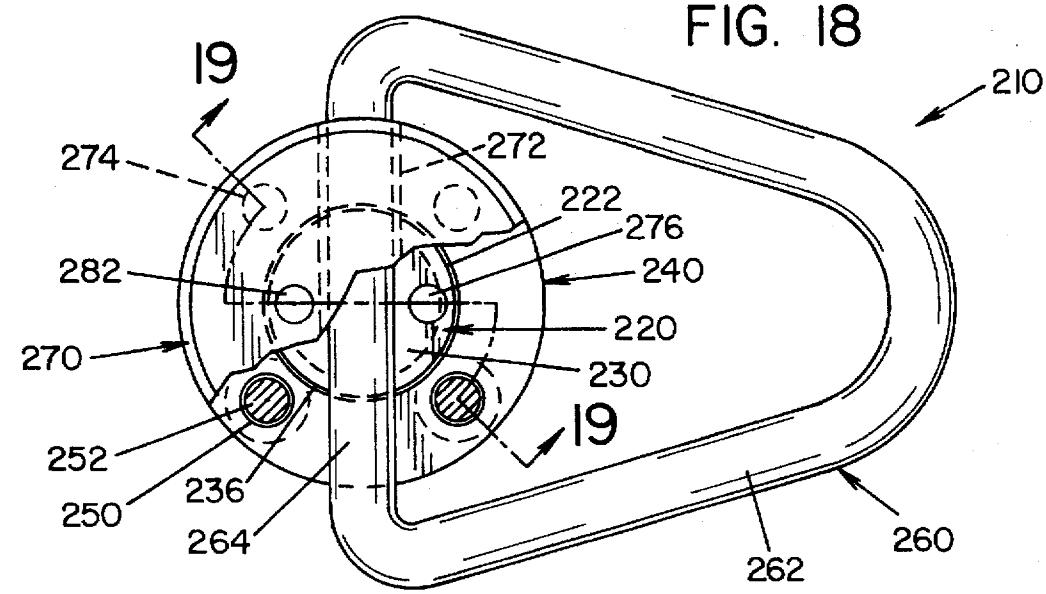
FIG. 18 is a plan view, somewhat cut away, of the fourth embodiment of the present invention.
Figure 19:
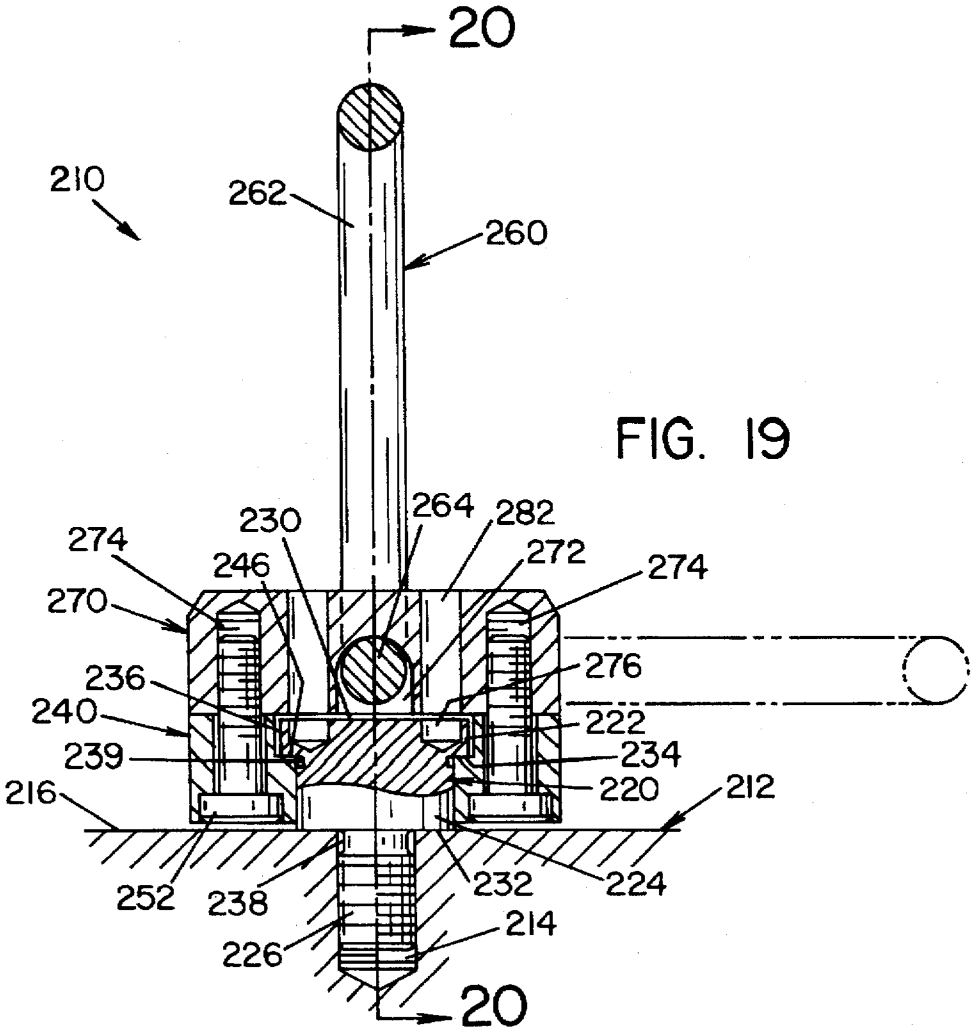
FIG. 19 is an elevation view, partially in cross-section, taken along line 19—19 of FIG. 18.

Reference is now had to an important embodiment of the present invention illustrated in FIGS. 17–23. This embodiment is similar to the embodiment of FIGS. 1–7, but advantageously provides for a simplified means and method of connecting a hoist device 210 to a load member 212. The load member 212 has a threaded bore 214 and an upper generally flat surface 216. A hoist device supporting stud 220 includes an upper cylindrical head 222 with a cylindrical body portion 224 below head 222 and terminating in a lower threaded shank 226. The diameters of the head 222, cylindrical body portion 224 and lower threaded shank 226 are progressively decreased as illustrated in FIGS. 17 and 19. Stud 220 is the load bearing member which must absorb both shear and tension in operation of hoist device 210. Stud 220 is illustrated with a top surface 230 having a lower bearing surface 232 which is torqued against surface 216 when stud 220 is in its load supporting position. The under surface of head 222 defines a downwardly facing load supporting shoulder 234 which is an annular shoulder or surface below a cylindrical surface 236 of head 222. Stud 220 is illustrated as having a recessed portion 238 between shank 226 and body portion 224 so that the threads can be properly machined into shank 226. A similar recess 239 divides head 222 from body portion 224.

To provide the swivel mechanism of the embodiment of FIGS. 17–23, a cylindrical base portion 240 is rotatably mounted on stud 220 after stud 220 has been passed through a central passage 242 of base portion 240. Central passage 242 includes an upper recess 244 for capturing head 222 and has an upper shoulder 246 for engaging load supporting shoulder 234 of head 222. This engagement comprises the force transmitting structure so that as member 240 is pulled upwardly, upper shoulder 246 engages lower shoulder 234 of head 222 so that stud 220 provides the lifting force for member 212. It will be understood that the central passage dimensions illustrated in FIG. 21 allow cylindrical base portion 240 to swivel around the assembled stud 220 because of their relationship to the dimensions of stud 220. Cylindrical base portion 240 also includes a plurality of countersunk bolt holes 250 for the bolts 252. It will be appreciated that, though this embodiment contemplates the use of four fixed bolts 252, as shown in other embodiments another number of bolts may be used or some other attachment including pins or an annular weld could be employed for assembling hoist device 210.

A continuous hoist ring 260, generally equivalent to that shown in previous embodiments, is employed. Continuous hoist ring 260 has an upper bight portion 262 and a straight cylindrical connecting portion 264. As described previously, hoist ring 260 is preferably a continuous forged steel component though it could be formed into the appropriate shape from a single piece of steel and welded together. Thus, transfer separation is prevented even when a lifting hook is applied at a wrong angle in the lifting operation.

In accordance with this embodiment, a cylindrical support member 270 matching generally the shape of base portion 240 is provided with a slot 272 for capturing cylindrical portion 264 of ring 260 between base portion 240 and support member 270. A plurality of threaded bores 274 coact with bolt holes 250 to allow bolts 252 to clamp cylindrical base portion 240 to cylindrical support member 270 in a manner which captures hoist ring 260 between the two members. Thus, these members rotate in unison about stud 220 while hoist ring 260 can pivot through approximately180°.

Like hoist device 10, hoist device 210 has the advantage of the continuous ring type hoisting device as well as the swiveling action previously obtained only in the clevis type of hoist device.

In accordance with a unique aspect of this embodiment, the two sockets 276 are provided within top surface 230 of head 222 for the purpose of using a wrench for assembling stud 220 into threaded bore 214 on load member 212 as will be described hereinafter.

Figure 22:
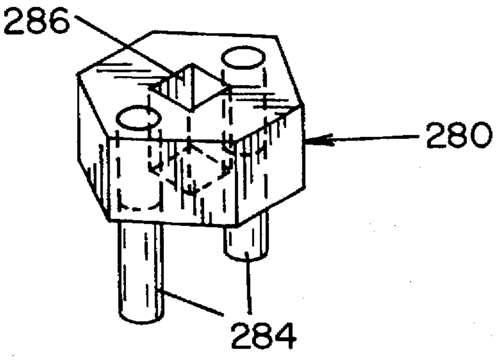
FIG. 22 is a pictorial view of a torque-controlling tool used with the stud shown in FIG. 17; and, FIG. 23 is an operational view showing the embodiment of FIG. 17 of the invention in cross-section, using the tool shown in FIG. 22 for controlling the torque applied to the load supporting stud shown in FIG. 17.
Figure 23:
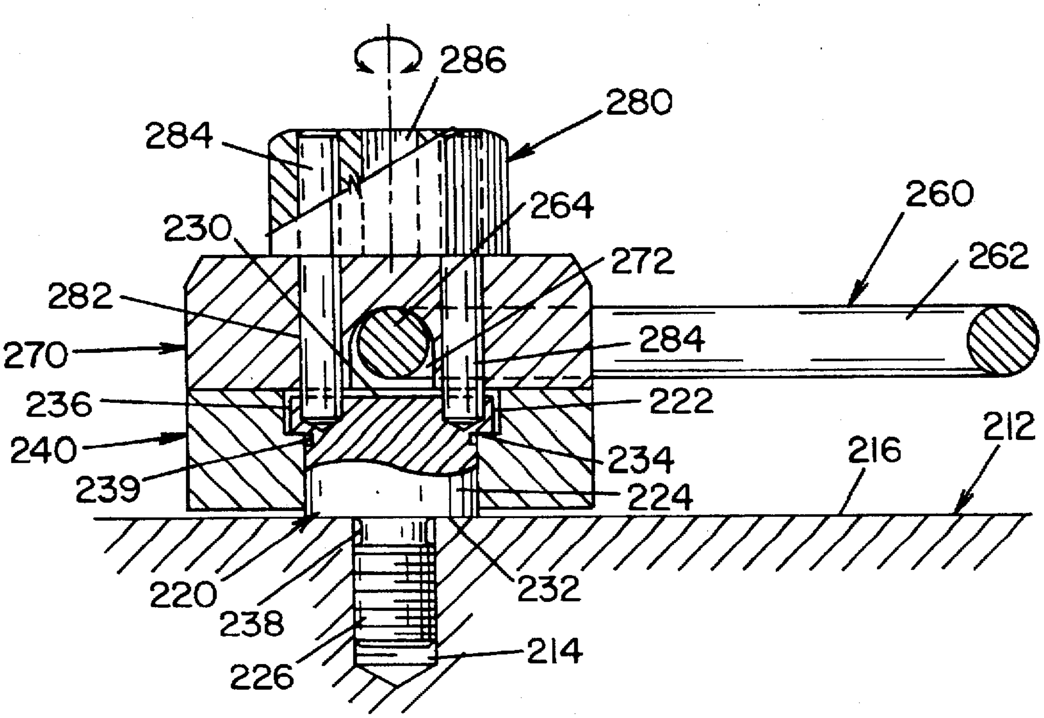

To assemble stud 220 into bore 214, bolts 252 assemble cylindrical base portion 240 and support member 270 together for capturing stud 220 within upper recess 244 and cylindrical connecting portion 264 in slot 272. This total assembly of hoist device 210 can then be shipped to the place of ultimate use. At the site, a wrench body 280, seen in FIG. 22, is placed within passage holes 282 extending axially through support member 270. Relative rotation between stud 220 within recess 244 is effected until passage holes 282 register with sockets 276, as best seen in FIG. 23. Wrench body 280, including the dowel pins 284, extend through passage holes 282 and into sockets 276 of head 222 so that stud 220 can be torqued into its proper position as shown in FIGS. 19 and 23. It will be appreciated that with this embodiment, wrench body 280 may be comprised of a standard hex head having dowel pins 284 extended from and placed therein. Thus, hoist device 210 is easier to install and can be used with a standard socket wrench or torque wrench. As shown in FIGS. 22 and 23, hoist device 210 can also be installed in tight spots or inaccessible areas using an allen wrench, screwdriver or similar device by inserting it with square through hole 286 and turning. Thus, a lever arm is not required for installation in those inaccessible areas where a lever arm to turn the wrench cannot be placed.

Referring now to FIG. 21, certain dimensional aspects of the present invention are illustrated. These dimensions are apparent from the description of the invention; however, FIG. 21, like FIG. 6, illustrates that dimension a is the amount that body portion 224 of stud 220 extends from base portion 240 when head 222 is in its lower position in recess 244. In that condition, dimension b is the clearance between the top of portion 240 and the top 230 of head 222. In practice, dimension a is substantially greater than dimension b. In this fashion, the two members 240 and 270, after having been secured together, prevent lower surface of member 240 from engaging surface 216 while load members 212 is connected to stud 220. Dimension c is the height of recess 244. This dimension is greater than the height d of head 222. By this relative relationship of the height of the recess and the height of the head, the head does not bind in recess 244 after the lower flat surface of support member 270 is clamped against the upper flat surface of base member 240. As a final dimensional aspect, body portion 224 has an effective length e between the lower portion of head 222 and the lower bearing shoulder 232 of stud 220. The dimension e dictates the outward extension of portion 224 as illustrated by dimension a. These dimensions, similar to the dimensions illustrated in FIG. 6, are provided to illustrate how the embodiment of FIGS. 17–23 are manufactured to maintain a free swiveling action.

The invention has been described with reference to a number of different embodiments. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

Having thus described the invention, it is claimed:

1. A hoist device for fixed engagement to a threaded bore on an outer surface of a load member, said hoist device comprising: a load engaging stud with a force supporting head; a cylindrical body portion with a lower, annular bearing shoulder and a threaded shank depending from said annular shoulder of said body portion; a base member having a body portion with a central passage through said base member and allowing a free swivel engagement of said base member with said load engaging stud when said stud is fixed to said load member by threading said shank through said central passage into said load member bore until said lower bearing shoulder is drawn against said outer surface of said load member, said central passage of said base member having an upper recess for capturing said force supporting head and an upper annular shoulder means for transmitting a force from said base member to said supporting head when said base member is pulled from said load member; a hoist ring having an upper bight portion and a lower generally cylindrical connecting portion; a hoist ring support member with a body portion; means for fixedly securing said support member to said base member while allowing said base member to swivel around said stud; and, a slot in one of said members between said body portion of said support member and the body portion of said base member for capturing said connecting portion of said hoist ring between said base member and said support member while allowing said hoist ring to pivot in said slot, said stud including a tool driving portion in said force supporting head, said tool driving portion including a tool engaging portion in said stud and at least one access opening in one of said members registered with said tool engaging portion when said one of said members and said stud are in a given relative angular position whereby an elongated tool can be extended through said opening into said tool engaging portion to rotate said stud and members in unison until said lower shoulder engages said surface of said load member.

2. The hoist device of claim 1, wherein said at least one access opening is in said support member.

3. The hoist device of claim 2, wherein said tool engaging portion includes at least one hole in said force supporting head.

4. The hoist device of claim 3, wherein said force supporting head includes two holes and said support member includes two access openings.

5. The hoist device of claim 1, wherein said tool engaging portion includes at least one hole in said force supporting head.

6. The hoist device of claim 5, wherein said load engaging stud has a central axis extending between said force supporting head and said threaded shank, said at least one hole extending axially within said force supporting head.

7. The hoist device of claim 6, wherein said force supporting head includes two axially extending holes.

8. The hoist device of claim 1, wherein said slot is in said support member.

9. The hoist device of claim 1, wherein said hoist ring is formed from an elongated bar formed and welded into a ring.

10. The hoist device of claim 1, wherein said means for fixedly securing are separate bolts.

11. The hoist device of claim 10, wherein said bolts extend from said base member and are threaded into said support member.

12. The hoist device of claim 1, wherein said securing means includes a female threaded portion on one of said members and a matching male threaded portion on the other of said members whereby said members are secured by rotating one with respect to the other.

13. The hoist device of claim 1, wherein said upper recess has a height greater than the height of said force supporting head by a first given amount so that said support member and said base member can freely rotate about said head when said support member is secured to said base member.

14. The hoist device of claim 13, wherein said lower bearing shoulder extends below said base member a second given amount when said upper annular shoulder engages said force supporting head.

15. The hoist device of claim 1, wherein said lower bearing shoulder extends below said base member a second given amount when said upper annular shoulder engages said force supporting head.

16. A hoist device for fixed engagement to a threaded bore on an outer surface of a load member, said hoist device comprising: a load engaging stud with a force supporting head; a cylindrical body portion with a lower, annular bearing shoulder and a threaded shank depending from said annular shoulder of said body portion; a base member having a body portion with a central passage through said base member and allowing a free swivel engagement of said base member with said load engaging stud when said stud is fixed to said load member, said lower bearing shoulder for being drawn against said outer surface of said load member; and a hoist ring having an upper bight portion and a lower connecting portion, said connecting portion fixedly secured to said base member while allowing said base member to swivel around said stud, said stud including a tool driving portion in said force supporting head, said tool driving portion including at least one tool engaging portion in said stud whereby an elongated tool can be extended into said tool engaging portion to rotate said stud until said lower shoulder engages said surface of said load member.

17. A hoist device for fixed engagement to a threaded bore on an outer surface of a load member, said hoist device comprising: a load engaging stud with a force supporting head; a cylindrical body portion with a lower, annular bearing shoulder and a threaded shank depending from said annular shoulder of said body portion; a base member having a body portion with a central passage through said base member and allowing a free swivel engagement of said base member with said load engaging stud when said stud is fixed to said load member by threading said shank through said central passage into said load member bore until said lower bearing shoulder is drawn against said outer surface of said load member, said central passage of said base member having an upper recess for capturing said force supporting head and an upper annular shoulder means for transmitting a force from said base member to said supporting head when said base member is pulled from said load member; a hoist ring having an upper bight portion and a lower generally cylindrical connecting portion; a hoist ring support member with a body portion; means for fixedly securing said support member to said base member while allowing said base member to swivel around said stud; and, a slot in one of said members between said body portion of said support member and the body portion of said base member for capturing said connecting portion of said hoist ring between said base member and said support member while allowing said hoist ring to pivot in said slot, said stud including a tool driving portion in said force supporting head, said tool driving portion including a tool engaging portion in said stud and at least one access opening in one of said support members registered with said tool engaging portion when said support member and stud are in a given relative angular position whereby an elongated tool can be extended through said opening into said tool engaging portion to rotate said stud and support member in unison until said lower shoulder engages said surface of said load member.

18. A hoist device for fixed engagement to a threaded bore on an outer surface of a load member, said hoist device comprising: a load engaging stud with a force supporting head; a cylindrical body portion with a lower, annular bearing shoulder and a threaded shank depending from said annular shoulder of said body portion; a base member having a body portion with a central passage through said base member and allowing a free swivel engagement of said base member with said load engaging stud when said stud is fixed to said load member, said lower bearing shoulder for being drawn against said outer surface of said load member; and a hoist ring having an upper bight portion and a lower connecting portion, said connecting portion fixedly secured to said base member while allowing said base member to swivel around said stud, said stud including a tool driving portion in said force supporting head, said tool driving portion including a tool engaging portion in said stud whereby an elongated tool can be extended into said tool engaging portion to rotate said stud until said lower shoulder engages said surface of said load member.

* * * * *